United States Patent
Chun-Nan et al.

(10) Patent No.: US 9,635,510 B1
(45) Date of Patent: Apr. 25, 2017

(54) DATABASE FOR WI-FI POSITION ESTIMATION

(71) Applicant: Athentek Innovations, Inc., Palo Alto, CA (US)

(72) Inventors: Chen Chun-Nan, Taipei (TW); Ivy H. Tseng, Taipei (TW); David S. De Lorenzo, Palo Alto, CA (US)

(73) Assignee: Athentek Innovations, Inc., Palo Alto, CA (US)

( * ) Notice: Subject to any disclaimer, the term of this patent is extended or adjusted under 35 U.S.C. 154(b) by 0 days.

(21) Appl. No.: 15/192,635

(22) Filed: Jun. 24, 2016

(51) Int. Cl.
*H04W 24/00* (2009.01)
*H04W 4/02* (2009.01)
*H04W 40/24* (2009.01)
*H04W 84/12* (2009.01)

(52) U.S. Cl.
CPC ......... *H04W 4/026* (2013.01); *H04W 40/244* (2013.01); *H04W 84/12* (2013.01)

(58) Field of Classification Search
CPC .... H04W 4/026; H04W 40/244; H04W 84/12
USPC ............................ 455/456.1, 456.6; 370/338
See application file for complete search history.

(56) References Cited

U.S. PATENT DOCUMENTS

| 7,769,396 | B2 | 8/2010 | Alizadeh-Shabdiz et al. |
|---|---|---|---|
| 8,897,803 | B2 | 11/2014 | Pylappan et al. |
| 9,037,162 | B2 | 5/2015 | Morgan et al. |
| 9,100,778 | B2 | 8/2015 | Stogaitis et al. |
| 9,119,168 | B2 | 8/2015 | Huang et al. |
| 2006/0095348 | A1 | 5/2006 | Jones et al. |
| 2006/0095349 | A1 | 5/2006 | Morgan et al. |
| 2006/0106850 | A1 | 5/2006 | Morgan et al. |
| 2006/0200843 | A1 | 9/2006 | Morgan et al. |
| 2006/0217131 | A1 | 9/2006 | Alizadeh-Shabdiz et al. |
| 2006/0240840 | A1 | 10/2006 | Morgan et al. |
| 2007/0004427 | A1 | 1/2007 | Morgan et al. |
| 2007/0004428 | A1 | 1/2007 | Morgan et al. |
| 2007/0167173 | A1 | 7/2007 | Halcrow et al. |
| 2007/0202888 | A1 | 8/2007 | Brachet et al. |
| 2007/0258408 | A1 | 11/2007 | Alizadeh-Shabdiz et al. |
| 2007/0258409 | A1 | 11/2007 | Alizadeh-Shabdiz et al. |
| 2007/0258420 | A1 | 11/2007 | Alizadeh-Shabdiz et al. |
| 2007/0258421 | A1 | 11/2007 | Alizadeh-Shabdiz et al. |
| 2007/0259624 | A1 | 11/2007 | Alizadeh-Shabdiz et al. |
| 2008/0008117 | A1 | 1/2008 | Alizadeh-Shabdiz |
| 2008/0008118 | A1 | 1/2008 | Alizadeh-Shabdiz |
| 2008/0008119 | A1 | 1/2008 | Alizadeh-Shabdiz |
| 2008/0008120 | A1 | 1/2008 | Alizadeh-Shabdiz |
| 2008/0008121 | A1 | 1/2008 | Alizadeh-Shabdiz |
| 2008/0108371 | A1 | 5/2008 | Alizadeh-Shabdiz et al. |
| 2008/0132170 | A1 | 6/2008 | Alizadeh-Shabdiz et al. |
| 2008/0139217 | A1 | 6/2008 | Alizadeh-Shabdiz et al. |
| 2008/0176583 | A1 | 7/2008 | Brachet et al. |
| 2008/0188239 | A1 | 8/2008 | Carlson et al. |

(Continued)

OTHER PUBLICATIONS

Cheng, Y.C. et al. "Accuracy Characterization for Metropolitan-scale Wi-Fi Localization," Intel Research, Intel Corporation, 13 pages, Jan. 2005.

(Continued)

*Primary Examiner* — Charles Shedrick
(74) *Attorney, Agent, or Firm* — Levine Bagade Han LLP (57) ABSTRACT

A database of Wi-Fi access point location data is built from (a) provisioning data; (b) GPS location estimates; and (c) inferred location estimates.

7 Claims, 8 Drawing Sheets

(56) References Cited

U.S. PATENT DOCUMENTS

| | | |
|---|---|---|
| 2008/0188244 A1 | 8/2008 | Mazlum et al. |
| 2008/0188245 A1 | 8/2008 | Alles et al. |
| 2008/0248741 A1 | 10/2008 | Alizadeh-Shabdiz |
| 2008/0248808 A1 | 10/2008 | Alizadeh-Shabdiz |
| 2009/0075672 A1 | 3/2009 | Jones et al. |
| 2009/0149197 A1 | 6/2009 | Morgan et al. |
| 2009/0154371 A1 | 6/2009 | Alizadeh-Shabdiz et al. |
| 2009/0175189 A1 | 7/2009 | Alizadeh-Shabdiz et al. |
| 2009/0252138 A1* | 10/2009 | Alizadeh-Shabdiz .. G01S 11/02 370/338 |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0052983 A1 | 3/2010 | Alizadeh-Shabdiz |
| 2011/0012780 A1 | 1/2011 | Alizadeh-Shabdiz |
| 2011/0012784 A1 | 1/2011 | Alizadeh-Shabdiz |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0080841 A1 | 4/2011 | Alizadeh-Shabdiz et al. |
| 2011/0093443 A1 | 4/2011 | Alizadeh-Shabdiz et al. |
| 2011/0164522 A1 | 7/2011 | Alizadeh-Shabdiz et al. |
| 2011/0177831 A1 | 7/2011 | Huang |
| 2011/0235623 A1 | 9/2011 | Alizadeh-Shabdiz et al. |
| 2011/0287783 A1 | 11/2011 | Alizadeh-Shabdiz et al. |
| 2011/0298659 A1 | 12/2011 | Alizadeh-Shabdiz |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2011/0317579 A1 | 12/2011 | Jones et al. |
| 2012/0007775 A1 | 1/2012 | Alizadeh-Shabdiz |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0178477 A1 | 7/2012 | Morgan et al. |
| 2012/0196621 A1 | 8/2012 | Alizadeh-Shabdiz et al. |
| 2012/0230313 A1 | 9/2012 | Alizadeh-Shabdiz |
| 2012/0280866 A1 | 11/2012 | Alizadeh-Shabdiz |
| 2012/0309420 A1 | 12/2012 | Morgan et al. |
| 2013/0072227 A1 | 3/2013 | Morgan et al. |
| 2013/0076569 A1 | 3/2013 | Alizadeh-Shabdiz |
| 2013/0184003 A1 | 7/2013 | Alizadeh-Shabdiz et al. |
| 2013/0217390 A1 | 8/2013 | Alizadeh-Shabdiz et al. |
| 2013/0241776 A1 | 9/2013 | Alizadeh-Shabdiz |
| 2013/0260797 A1 | 10/2013 | Jones et al. |
| 2013/0288708 A1 | 10/2013 | Alizadeh-Shabdiz |
| 2014/0009339 A1 | 1/2014 | Sutton et al. |
| 2014/0049424 A1 | 2/2014 | Alizadeh-Shabdiz |
| 2014/0080510 A1 | 3/2014 | Morgan et al. |
| 2014/0135033 A1 | 5/2014 | Alizadeh-Shabdiz |
| 2014/0160963 A1 | 6/2014 | Alizadeh-Shabdiz et al. |
| 2014/0187169 A1 | 7/2014 | Alizadeh-Shabdiz et al. |

OTHER PUBLICATIONS

Koo, J. et al. "Localizing WiFi Access Points Using Signal Strength," *IEEE,* 15(2), pp. 187-189, Feb. 2011.

Koo, J. et al. "Unsupervised Locating of WiFi Access Points Using Smartphones," *IEEE,* 42(6), pp. 1341-1353, Nov. 2012.

Koo, J. et al. "Autonomous Construction of a WiFi Access Point Map Using Multidimensional Scaling," *Proceedings of the Pervasive Computing—9th International Conference, Pervasive 2011,* vol. 6696, pp. 115-132, Jun. 2011.

LaMarca, A. et al. "Self-Mapping in 802.11 Location Systems," *UbiComp 2005 Proceedings of the 7th International Conference on Ubiquitous Computing,* vol. 3660, pp. 87-104, Sep. 2005.

Sapiezynski, P. et al. "Opportunities and Challenges in Crowdsourced Wardriving," *Proceedings of the 2015 ACM Conference on Internet Measurement Conference,* pp. 267-273, Oct. 2015.

\* cited by examiner

Fig. 1

| AP ID #1 | LOC #1 | ERROR #1 |
|---|---|---|
| AP ID #2 | LOC #2 | ERROR #2 |
| ... | | |
| ... | | |
| AP ID N | LOC N | ERROR N |

TABLE OF PROVISIONED APs

Fig. 2

STEP 1

Fig. 3

| REPORT NUMBER | GPS FLAG | GPS POSITION | GPS POSITION ERROR | INFERENCE FLAG | ... | AP IDS HEARD | | | | | |
|---|---|---|---|---|---|---|---|---|---|---|---|
| 1 | • | x y | σ | | | 1 | 3 | 4 | 6 | 11 | |
| 2 | | | | | | 4 | 5 | 7 | 13 | | |
| 3 | • | x y | σ | | | 3 | 7 | 11 | | | |
| 4 | • | x y | σ | | | 2 | 5 | 12 | | | |
| 5 | | | | | | 2 | 5 | 7 | 11 | | ... |
| ... | | | | | | | | | | | ... |
| N | | | | | | | | | | | ... |

TABLE OF MEASUREMENT REPORTS

DATABASE FOR WI-FI POSITION ESTIMATION

TECHNICAL FIELD

The disclosure is related to position estimation with Wi-Fi beacons.

BACKGROUND

Wireless devices attached to pets, children, or old people allow their loved ones to keep track of them via a mobile device application interface. The wireless devices estimate their position from global positioning system (GPS), cell tower, and/or Wi-Fi beacon reception.

When a wireless device detects one or more Wi-Fi beacons, it can estimate its position based on the locations of the beacons. However, the accuracy of the position estimate depends on how well the locations of the beacons are known.

One way to determine beacon locations is to physically survey them; i.e. visit each beacon site and record beacon identification and location information in a database. Such a survey, while potentially producing high quality beacon location information, is quite tedious. Furthermore, the vast majority of Wi-Fi beacons are not accessible in this manner.

Thus, what are needed are systems and methods for estimating Wi-Fi beacon locations without having to physically survey them.

DETAILED DESCRIPTION

A method for building a database of Wi-Fi beacon locations is based on estimating locations of three classes of Wi-Fi beacons: (a) beacons at surveyed locations, (b) beacons detected by receivers from known positions as estimated by GPS, and (c) beacons detected by receivers from unknown positions. Case (c) most often occurs when GPS signals are not available, such as when a receiver is indoors.

Even when GPS is not available, Wi-Fi beacon locations may be inferred. Inferred locations usually carry greater estimated location error than surveyed or GPS-derived locations, but uncertain location information is still much more useful than no information. The methods for building a database of Wi-Fi beacon locations described below include methods to keep track of estimated errors in surveyed, GPS-based, or inferred locations.

Whenever a Wi-Fi beacon has a location associated with it, that location may be used in a method to infer locations of other beacons. Multiple rounds of inference and location estimation may be used to build up a database of estimated locations, albeit with increased location error each round. The number of rounds of inference may be limited explicitly (e.g. either a certain number of rounds or until no new location inferences are produced) or implicitly (e.g. when inferred location error exceeds a threshold value).

In this disclosure "Wi-Fi beacon", "WLAN access point", "AP", "wireless access point" and similar terms all have the same meaning, namely a radio beacon designed for wireless connection to a network, most commonly using IEEE 802.11 standards. "GPS" is used as a shorthand to refer to any global navigational satellite system (GNSS) including the NAVSTAR global positioning system, Beidou, Glonass, Galileo, and other satellite navigation systems.

Figure 1:
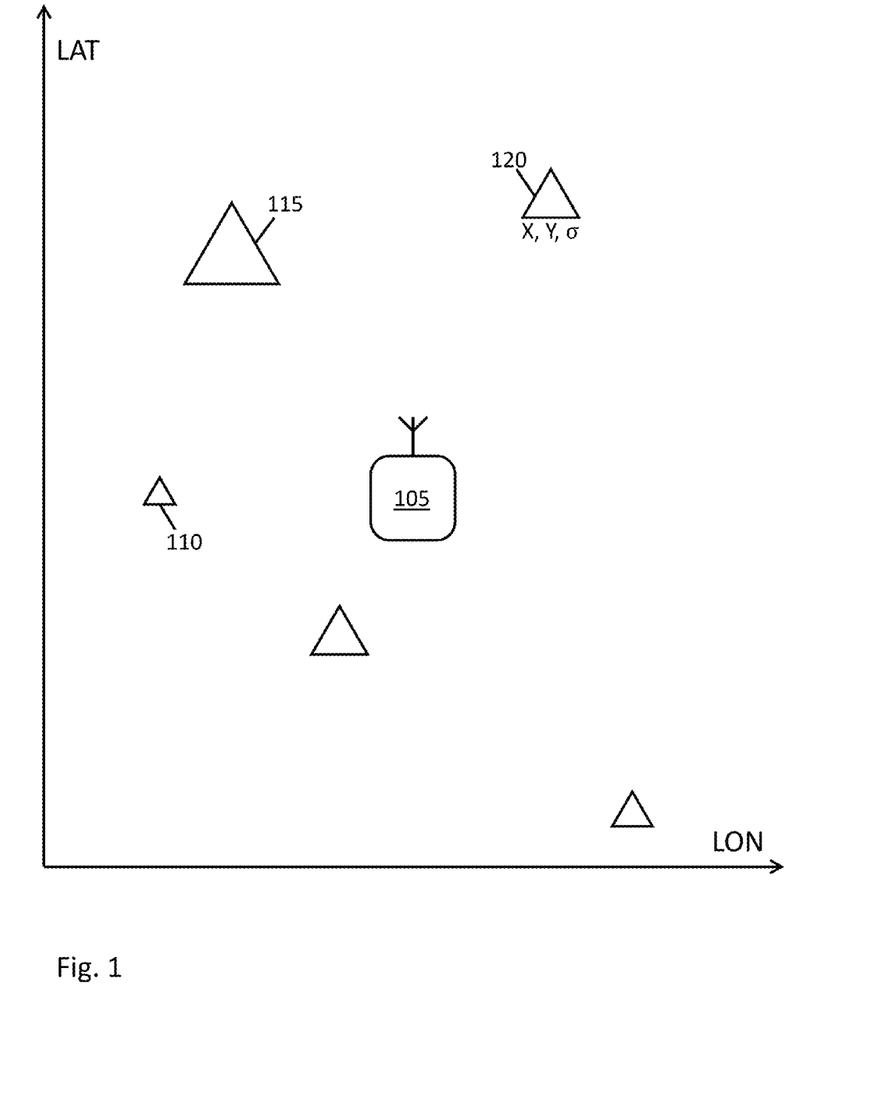
FIG. 1 illustrates a wireless device and several Wi-Fi beacons.

When a receiver detects a set of Wi-Fi beacons it can estimate its own position based on the locations of the beacons. FIG. 1 illustrates a wireless device and several Wi-Fi beacons, for example. In FIG. 1, wireless device 105 includes a GPS receiver, a Wi-Fi receiver, and, optionally, a cellular radio transceiver. Several Wi-Fi beacons are shown, such as beacons 110, 115, and 120. The size of the beacon symbols drawn in the figure may be interpreted as an indication of the uncertainty or error in each beacon's estimated location. For example, beacon 110 is drawn smaller than beacon 115, implying that the location of beacon 110 is known more accurately than that of beacon 115. Some beacons, such as beacon 120, may have surveyed position (X, Y) and location uncertainty ($\sigma$) data associated with them. The location of each beacon and the position of the wireless device may be specified along latitude (LAT) and longitude (LON) axes as shown or in any other convenient coordinate system.

A wireless device may estimate its own position using methods based on the idea that in order for a device to be able to detect a beacon, the device must be near the beacon. For example, if wireless device 105 detects beacons 110, 115, and 120 with similar signal intensity, then one may conclude that the wireless device is near the centroid of the locations of these beacons rather than being co-located with any one of them. Further, a weighted centroid may represent a more accurate location estimate than an unweighted centroid, particularly when weighting accounts for the uncertainty or error in each beacon's estimated location. In other words, if the location of beacon 110 is known more accurately than that of beacon 115, then there is likely to be less ambiguity in the estimated location of a wireless device detecting beacon 110 than one detecting beacon 115.

A wireless device can obtain a better position estimate the better the locations of the beacons it detects are known, and the better the uncertainties or errors in the beacons estimated locations are known. The method for building a database of Wi-Fi beacon locations described below includes methods for inferring the locations of beacons and determining uncertainty or error in beacon estimated locations.

Figure 2:
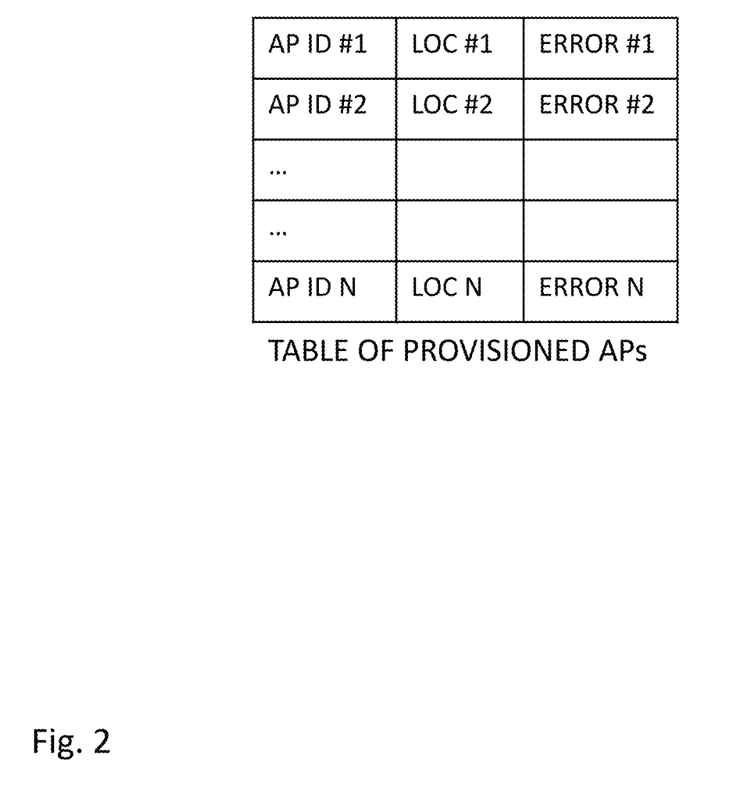
FIG. 2 illustrates a table of provisioned Wi-Fi beacons.

A first category of beacons is those whose locations are known by survey. These are also referred to as "provisioned" beacons. A set of beacons installed in a commercial building may fall in this category if the location of each beacon is recorded when it is installed. However even provisioned beacons may not have perfect location estimates. Thus estimated error in their surveyed locations is greater than zero. FIG. 2 shows a table of provisioned Wi-Fi beacons. Each beacon has an identification number (e.g. "AP ID #2"), a location (e.g. "LOC #2") and an estimate of the location error (e.g. "ERROR #2").

Figure 3:
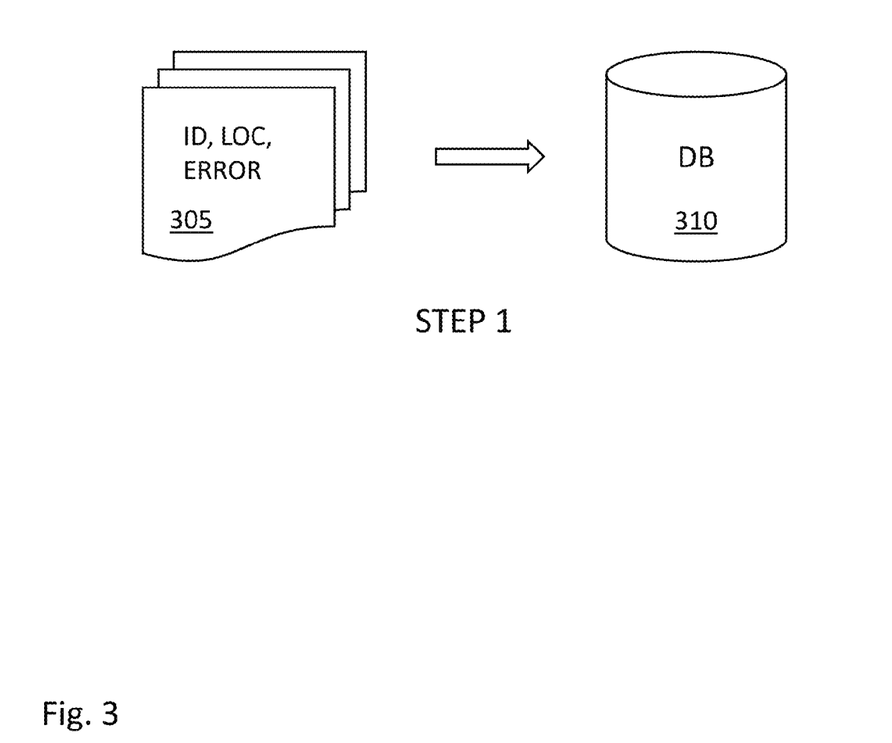
FIG. 3 illustrates STEP 1 of a method for building a Wi-Fi beacon database.

The first step of a method for building a database of Wi-Fi beacon locations is to load information for known provisioned Wi-Fi beacons into a database. This is shown in FIG. 3, "STEP 1". In the figure, location information 305 for provisioned Wi-Fi beacons is stored in database (DB) 310.

Figure 4:
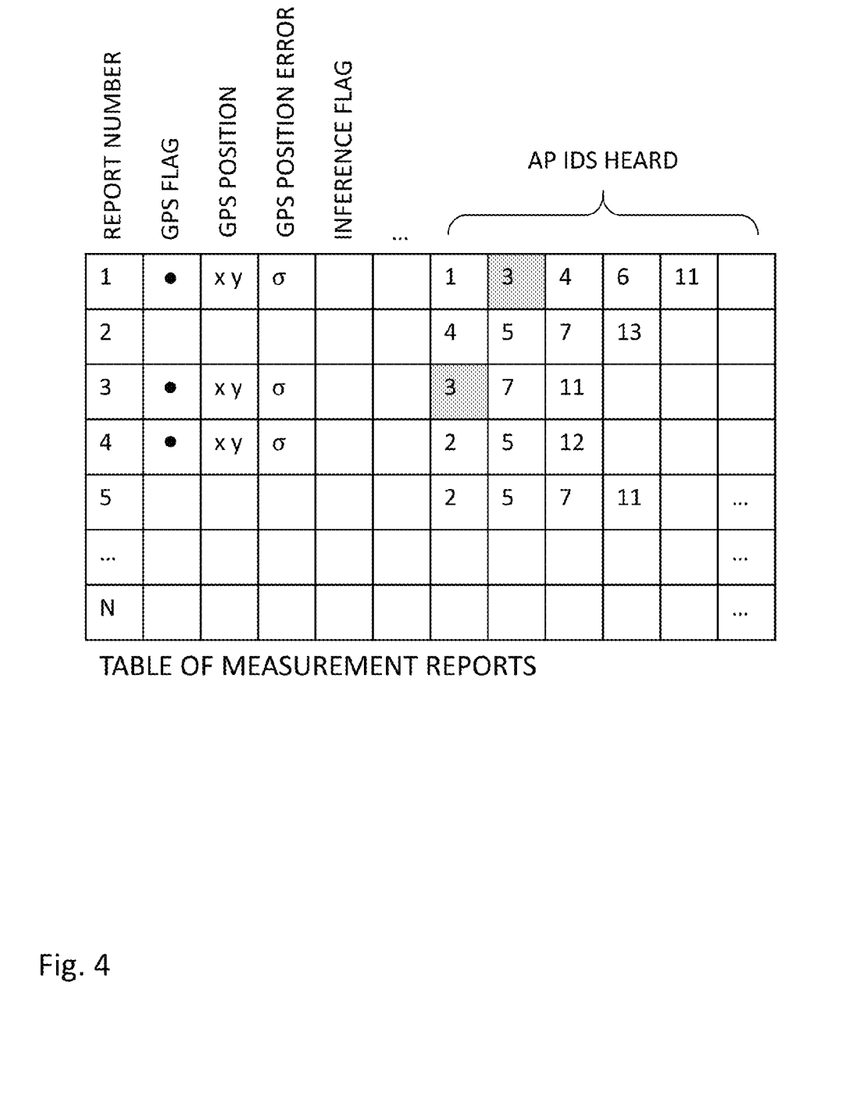
FIG. 4 shows a table of measurement reports.

Whenever a wireless device receives signals from a set of Wi-Fi beacons it may generate a measurement report. FIG. 4 shows a table of measurement reports where each row of the table is one report. Each measurement report includes an identifying report number, position data if available, and identifying information for each Wi-Fi beacon detected.

In the table of measurement reports in FIG. 4, the first column, "REPORT NUMBER", lists information that identifies each report. The second column, "GPS FLAG", indicates whether or not the wireless device that detected the Wi-Fi beacons listed in the report was able to estimate its position based on GPS signals received at the time of the report (i.e. a "contemporaneous GPS position estimate"). In FIG. 4, a dot in the GPS FLAG column indicates that a GPS-based position estimate is available and the "GPS POSITION" and "GPS POSITION ERROR" columns contain GPS-based position information, and estimates as to the expected error in the position information, respectively. The "INFERENCE FLAG" column indicates whether or not an inferred position for the measurement report has been computed. Ellipsis ( . . . ) indicate additional columns not shown in FIG. 4 such as columns for inferred position and inferred position error. Columns labelled "AP IDS HEARD" list identification data for Wi-Fi beacons detected. The first row of the table in FIG. 4 indicates that wireless access points with identification numbers 1, 3, 4, 6, and 11 were detected and that a simultaneous GPS position estimate and estimate of GPS position error are available.

Figure 5:
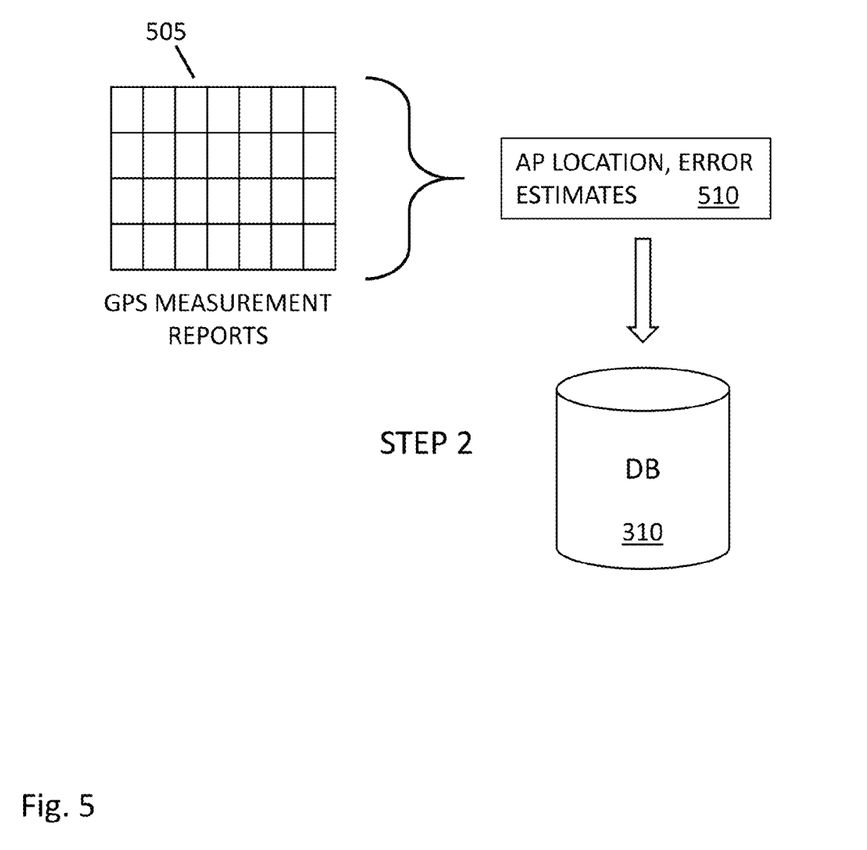
FIG. 5 illustrates STEP 2 of a method for building a Wi-Fi beacon database.

The next step of a method for building a database of Wi-Fi beacon locations is to estimate the locations of Wi-Fi beacons that are detected by a wireless device when GPS position information is available. FIG. 5, "STEP 2", illustrates this step conceptually; the underlying details are now described.

First, measurement reports having GPS position information (GPS FLAG set) are selected from the table of all measurement reports. These reports may be called "GPS measurement reports" or simply "GPS reports". In FIG. 4, report numbers 1, 3, and 4 are GPS reports while report numbers 2 and 5 are not.

Next, a list of all beacons that appear in GPS reports is constructed. A list of all beacons that appear in GPS reports 1, 3, and 4, for example is the list of AP IDs: {1, 2, 3, 4, 5, 6, 7, 11, 12}.

Next, a set of steps is performed for each beacon in the list of AP IDs just mentioned. In other words, a set of steps will be performed for beacon 1, then the same set of steps will be performed for beacon 2, then beacon 3, etc. Here we use beacon 3 (AP ID 3) as an example.

For each beacon, first obtain positions and estimated errors from each measurement report that includes the beacon. Using beacon 3 as an example, inspection of FIG. 4 reveals that two GPS position and position error reports are available: report 1 and report 3.

Suppose, for example, that reports 1 and 3 include the following data:

| REPORT NUMBER | GPS LATITUDE (deg) | GPS LONGITUDE (deg) | GPS ERROR (m) |
|---|---|---|---|
| 1 | 44.934 | −93.2545 | 10 |
| 3 | 44.932 | −93.2555 | 20 |

Next, a weighting factor is computed for each GPS position. The weighting factor, $w_i$, for the position reported in the ith measurement report may be computed as:

$$w_i = \frac{\left(\frac{1}{\hat{\sigma}_i}\right)^2}{\sum_i \left(\frac{1}{\hat{\sigma}_i}\right)^2}$$

Here $\hat{\sigma}_i$ is the estimated error of the ith position estimate, for example the radius of a circle having a 67% likelihood of containing the wireless device and centered on the ith GPS-based position estimate.

Note that the sum of all weighting factors for one beacon is one:

$$\Sigma w_i = 1$$

In this example, $w_1 = 4/5$ and $w_2 = 1/5$.

Next, a weighted location estimate is computed by weighting each GPS-based position by its weighting factor. In this example, the weighted location estimate is:

$$\text{Latitude} = \frac{4}{5}(44.934) + \frac{1}{5}(44.932) = 44.9336$$

$$\text{Longitude} = \frac{4}{5}(-93.2545) + \frac{1}{5}(-93.2555) = -93.2547$$

Next, the estimated location error of the weighted location estimate is computed according to:

$$\sigma_m^2 = \Sigma w_i^2 \cdot \hat{\sigma}_i^2$$

Here, $\hat{\sigma}_m$ is the estimated error of the weighted location estimate. In this example, the estimated error of the weighted location estimate is 8.9 m.

Finally, the weighted location estimate and location error estimate for the Wi-Fi beacon is stored in a database. In this example, the following information is stored:

| AP ID | GPS LATITUDE (deg) | GPS LONGITUDE (deg) | GPS ERROR (m) |
|---|---|---|---|
| 3 | 44.9336 | −93.2547 | 8.9 |

The procedure just described is repeated for each beacon that appears in a GPS measurement report. In this way estimated location and estimated location error may be computed for any Wi-Fi beacon that is detected by a wireless device when that device is also able to simultaneously estimate its own position via GPS.

FIG. 5 summarizes STEP 2 of a method for building a database of Wi-Fi beacon locations as just described. GPS measurement reports 505 are processed to generate location and error estimates 510 for Wi-Fi beacons. These estimates are then stored in database 310.

Figure 6:
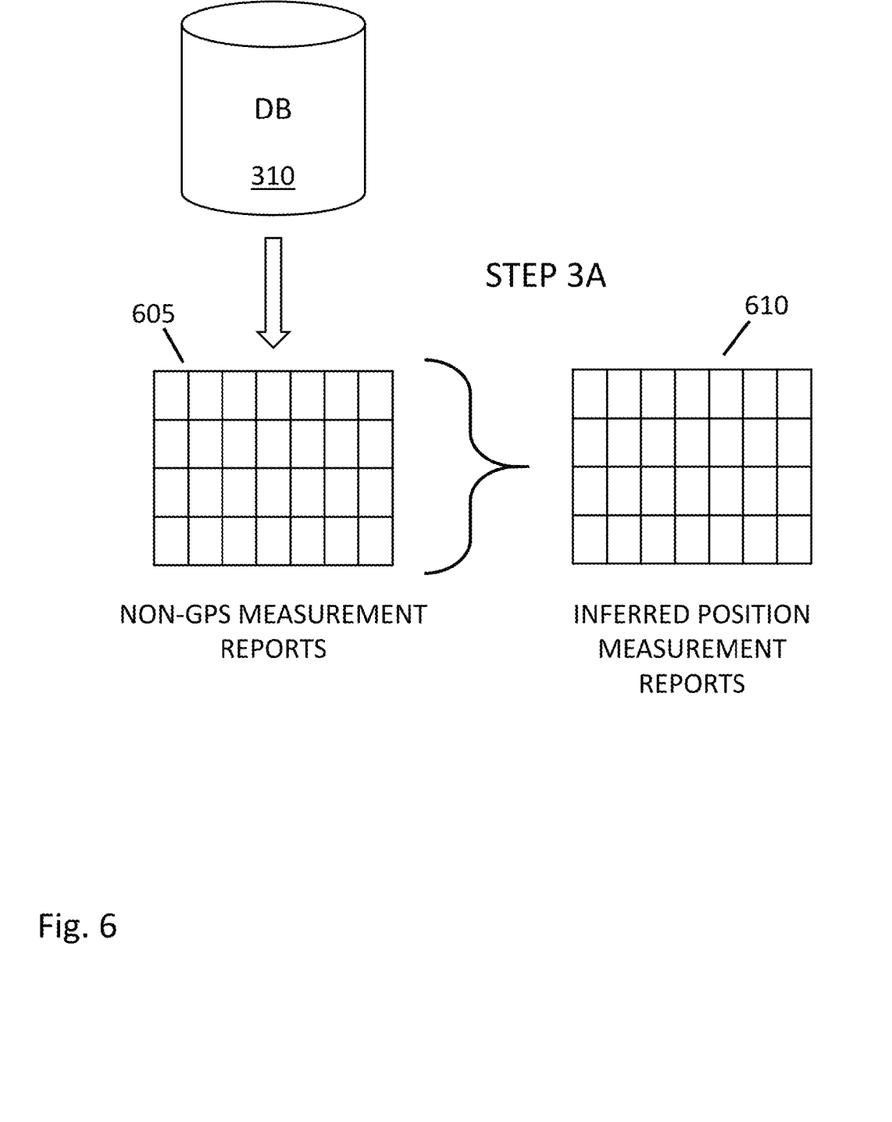
FIG. 6 illustrates STEP 3A of a method for building a Wi-Fi beacon database.
Figure 7:
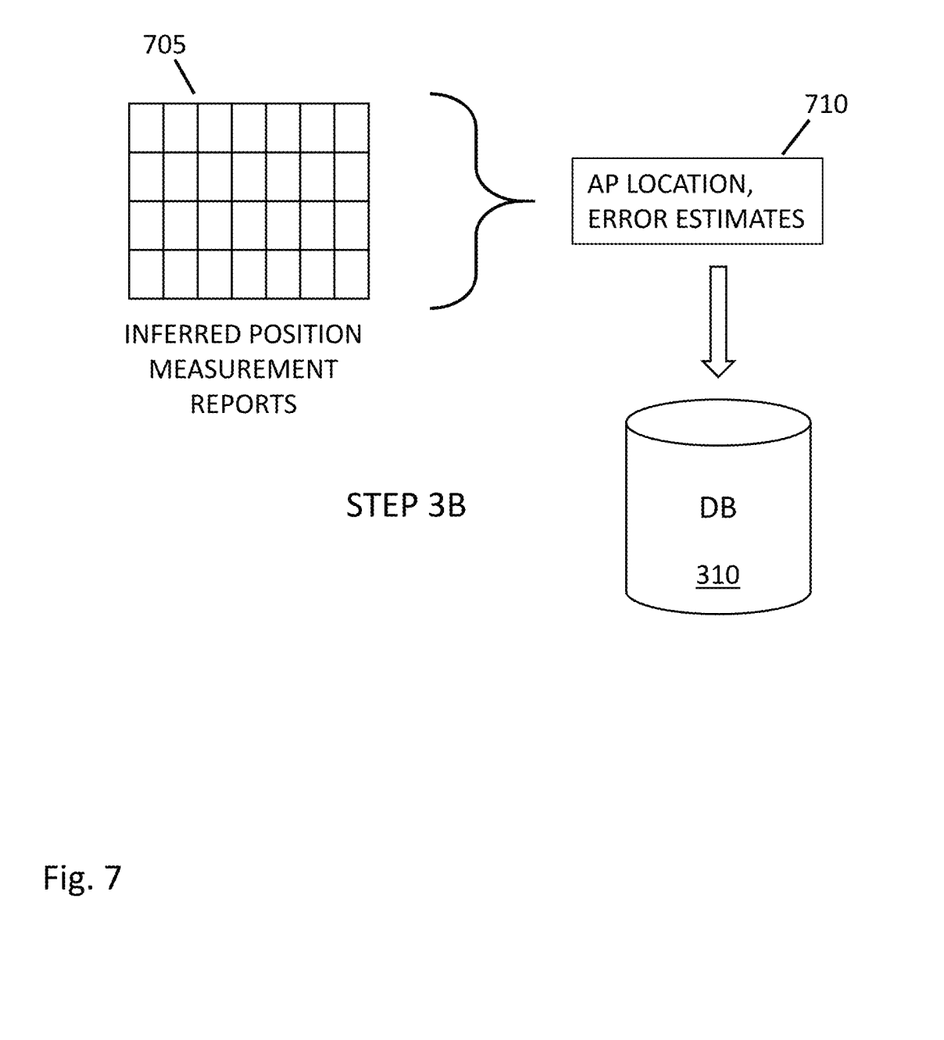
FIG. 7 illustrates STEP 3B of a method for building a Wi-Fi beacon database.

The next step of a method for building a database of Wi-Fi beacon locations is to estimate the locations of Wi-Fi beacons that are detected by a wireless device when GPS position estimates are not available. FIGS. 6 and 7, "STEP 3A" and "STEP 3B", respectively, illustrate this step conceptually; the underlying details are now described.

The overall procedure involves first inferring Wi-Fi beacon locations and then second using inferred locations to estimate locations of other Wi-Fi beacons. This procedure involves an "infer process" illustrated in FIG. 6 and a "locate process" illustrated in FIG. 7. The two processes are conducted alternately in a loop: infer, locate, infer, locate, etc.

The infer process is based on the idea that a detected beacon having an unknown location is likely to be near other, simultaneously-detected beacons having known locations. For example, measurement report #2 in FIG. 4 has no GPS position data associated with it. Suppose the location of Wi-Fi beacon #13 is unknown, but location estimates for Wi-Fi beacons 4, 5, and 7 exist because those beacons appear in other measurement reports that do have GPS position data. One may infer that Wi-Fi beacon #13 is located near beacons 4, 5, and 7 since beacons 4, 5, 7, and 13 were detected simultaneously by one wireless device. Locations estimated by the "infer process" may be referred to, unsurprisingly, as "inferred location estimates" or "inferred locations".

The infer process proceeds as follows. First, measurement reports not having GPS position information (GPS FLAG not set) are selected from the table of all measurement reports. These reports are called "non-GPS measurement reports" or simply "non-GPS reports". In FIG. 4, report numbers 1, 3, and 4 are GPS reports while report numbers 2 and 5 are non-GPS reports.

Next, a set of steps is performed for each non-GPS report. First, for each non-GPS report, a list is constructed of all beacons that not only appear in the report, but also are already in the database. If no such beacons exist, then the process skips to the next (non-GPS) measurement report.

Next, the location estimate and location error estimate for each beacon in the list just constructed is retrieved from the database. These locations and location error estimates are now used to compute an inferred position estimate and an inferred position error estimate for the measurement report.

The procedure for computing an inferred position and error estimate is similar to the procedure outlined above for computing a Wi-Fi beacon location and error estimate given a set of GPS position and error estimates. Here it is beacon location and error estimates retrieved from the database that are inputs for computing weighting factors, weighted location estimates, and error estimates.

The result is that a measurement report that had no position estimate may now have an inferred position estimate and an error estimate for that inferred position. This information is used to update the table of measurement reports. The infer process loops over non-GPS reports until no new inferred positions are generated.

The locate process is similar to the process described above (i.e. STEP 2) for estimating Wi-Fi beacon locations based on GPS measurement reports, except that it uses inferred position estimates rather than GPS position estimates.

The locate process starts with construction of a list of all Wi-Fi beacons that appear in measurement reports that have an inferred location estimate and are not in the database. Next a set of steps is performed for each beacon in the list. The steps are the same as the steps described above for beacons in a list of beacons that appear in GPS reports. This time, however, the list that is processed is a list of beacons that have inferred locations rather than GPS locations. The result is an inferred location and an estimate of the error in the inferred location for each beacon in the list.

The infer/locate loop may proceed as long as inferred location estimates can be computed for measurement reports not having GPS position estimates. When no additional measurement reports are able to be assigned an inferred position estimate, then no additional beacon location estimates are computed.

FIGS. 6 and 7 summarize STEPS 3a and 3b, respectively, of a method for building a database of Wi-Fi beacon locations as just described. In FIG. 6, Wi-Fi beacon location estimates from database 310 are processed with non-GPS measurement reports 605 to generate inferred position estimates for measurement reports. In FIG. 7, inferred position measurement reports 705 are processed to generate Wi-Fi beacon location and error estimates 710. These estimates are stored in database 310.

Figure 8:
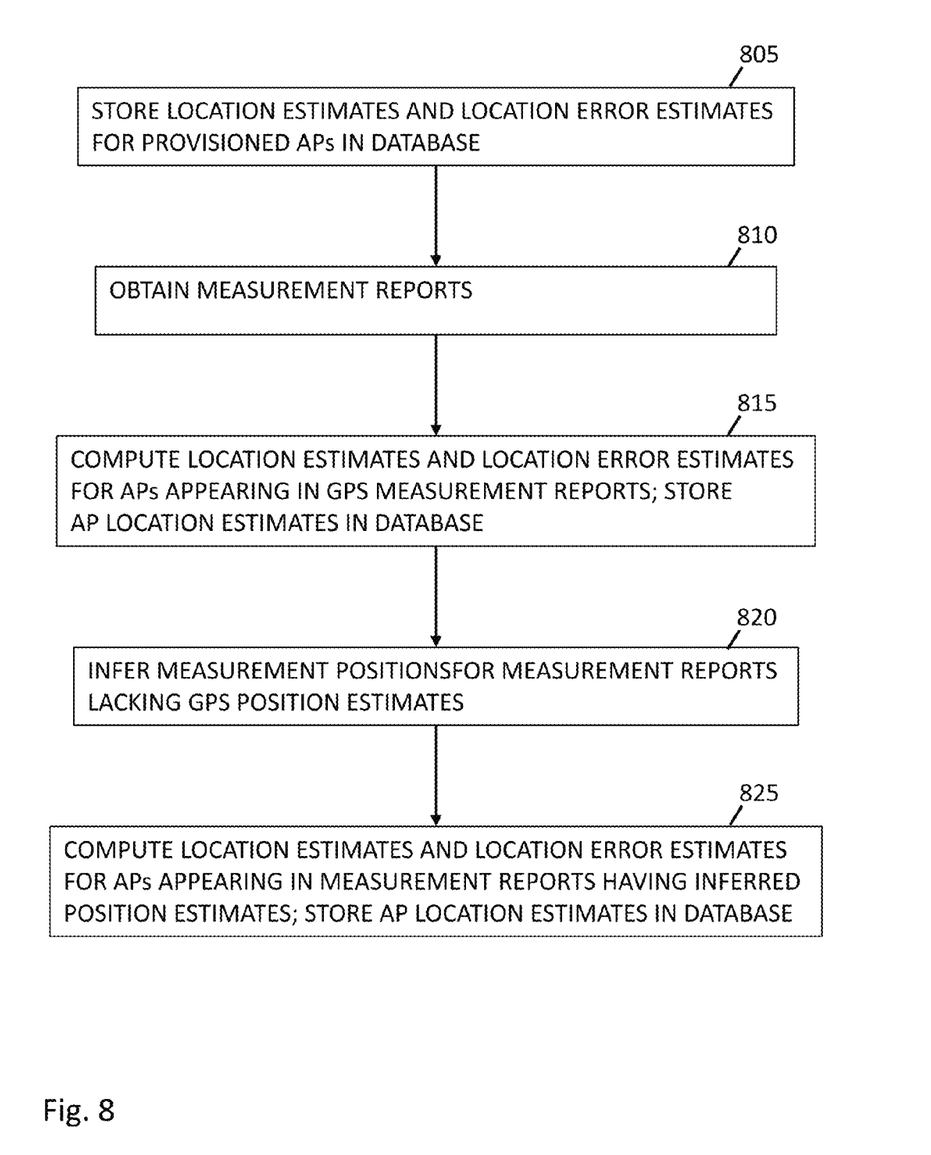
FIG. 8 is a flow chart for a method for building a Wi-Fi beacon database.

FIG. 8 is a flow chart for a method for building a Wi-Fi beacon database. Steps 805 through 825 are: storing location estimates and location error estimates for provisioned Wi-Fi access points in a database; obtaining measurement reports; computing location and location error estimates for Wi-Fi access points that appear in GPS measurement reports and storing these estimates in the database; inferring measurement positions for non-GPS measurement reports; and computing location and error estimates for Wi-Fi access points appearing in non-GPS measurement reports, and storing these estimates in the database.

The methods described above are useful for building a database of Wi-Fi beacon locations. The information contained in the database allows wireless devices to estimate their position based on detecting Wi-Fi access points even when GPS position estimates are not available.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for building a Wi-Fi beacon database comprising:
    (a) storing surveyed-location estimates and surveyed-location-error estimates for surveyed Wi-Fi beacons in the database;
    (b) computing GPS-based-location estimates and GPS-based-location-error estimates for Wi-Fi beacons detected by a wireless device contemporaneously with GPS position estimates for the wireless device, and storing the GPS-based-location estimates and GPS-based-location-error estimates in the database;
    (c) computing inferred-position-estimates and inferred-position-error estimates for the wireless device when Wi-Fi beacons are detected without contemporaneous GPS position estimates for the wireless device; and,
    (d) computing inferred-location estimates and inferred-location-error estimates for Wi-Fi beacons detected by the wireless device without contemporaneous GPS position estimates for the wireless device, and storing the inferred-location estimates and inferred-location-error estimates in the database.

2. The method of claim 1 where step (b) comprises forming a weighted average of the GPS position estimates for the wireless device.

3. The method of claim 2 where weighting factors in the weighted average are inversely proportional to estimated error of the GPS position estimates for the wireless device.

4. The method of claim 1 where step (c) comprises the wireless device contemporaneously detecting Wi-Fi beacons having known locations and Wi-Fi beacons having unknown locations.

5. The method of claim 1 where steps (c) and (d) are repeated in a loop until no new inferred position estimates are obtained.

6. The method of claim 1 where steps (c) and (d) are repeated in a loop until a specified maximum number of loop iterations have been performed.

7. The method of claim 1 where steps (c) and (d) are repeated in a loop until an inferred-location-error threshold has been exceeded.

* * * * *